United States Patent
Sarta et al.

(10) Patent No.: US 10,255,207 B2
(45) Date of Patent: Apr. 9, 2019

(54) METHOD AND APPARATUS USE WITH INTERRUPTS

(71) Applicants: STMicroelectronics (Research & Development) Limited, Marlow (GB); STMicroelectronics (Grenoble 2) SAS, Grenoble (FR)

(72) Inventors: Davide Sarta, Bristol (GB); Ignazio Antonino Urzi, Voreppe (FR)

(73) Assignees: STMicroelectronics (Research & Development) Limited, Marlow (GB); STMicroelectronics (Grenoble 2) SAS, Grenoble (FR)

( * ) Notice: Subject to any disclaimer, the term of this patent is extended or adjusted under 35 U.S.C. 154(b) by 335 days.

(21) Appl. No.: 14/536,014

(22) Filed: Nov. 7, 2014

(65) Prior Publication Data
US 2015/0127865 A1 May 7, 2015

(30) Foreign Application Priority Data

Nov. 7, 2013 (GB) .................................. 1319683.7

(51) Int. Cl.
*G06F 13/24* (2006.01)
*G06F 13/42* (2006.01)

(52) U.S. Cl.
CPC .......... *G06F 13/24* (2013.01); *G06F 13/4221* (2013.01)

(58) Field of Classification Search
CPC ............................. G06F 13/24; G06F 13/4221
See application file for complete search history.

(56) References Cited

U.S. PATENT DOCUMENTS

| 5,664,213 A | 9/1997 | Steele et al. | |
|---|---|---|---|
| 5,848,278 A | 12/1998 | Sakai | |
| 5,892,956 A | 4/1999 | Qureshi et al. | |
| 5,901,321 A * | 5/1999 | Kim | G06F 13/26 370/479 |
| 5,951,669 A * | 9/1999 | Bailey | G06F 13/24 710/23 |
| 6,205,508 B1 * | 3/2001 | Bailey | G06F 13/26 710/260 |
| 6,978,331 B1 * | 12/2005 | Kagan | H04L 1/0063 710/268 |
| 2003/0218071 A1 * | 11/2003 | Chen | G06K 19/0719 235/492 |
| 2010/0191911 A1 * | 7/2010 | Heddes | G06F 15/16 711/118 |
| 2012/0284442 A1 * | 11/2012 | Card | G06F 13/24 710/260 |

FOREIGN PATENT DOCUMENTS

EP 0 953 913 A1 11/1999

OTHER PUBLICATIONS

Search Report for Corresponding GB Application No. GB1319683.7, dated Apr. 10, 2014, 3 pages.

* cited by examiner

*Primary Examiner* — Eric Oberly
(74) *Attorney, Agent, or Firm* — Seed IP Law Group LLP

(57) ABSTRACT

A system is configured to capture a set of interrupts and output the interrupts serially onto an interconnect. The interrupts, which are routed to a destination, may first be packetized such that additional information is associated with the interrupt within the packet.

21 Claims, 6 Drawing Sheets

METHOD AND APPARATUS USE WITH INTERRUPTS

BACKGROUND

Technical Field

Some embodiments relate to a method and apparatus and in particular to a method and apparatus for providing interrupt requests.

Description of the Related Art

Interrupt Requests (IRQ) are used as a way for a device or block to request time from a processor to do a task associated with the device or block. However as systems have become more complex, more and more interrupt requests need to be managed. This may take increasing amounts of an area of an integrated circuit which may be undesirable.

BRIEF SUMMARY

According to an aspect, there is provided a method comprising capturing a set of interrupts, and outputting serially said interrupts onto an interconnect for routing to a destination.

Only active interrupts may be output onto said interconnect.

The method may comprise processing said interrupts, and outputting said processed interrupt serially onto said interconnect.

The method may comprise determining if all of said captured interrupts which are to be output onto said interconnect have been output onto said interconnect before processing another set of captured interrupts.

The method may comprise updating an interrupt status register each time an interrupt has been processed.

While a first set of interrupts is being processed a second set of interrupts may be captured.

The processing may comprise packetizing an interrupt before outputting the interrupt onto said interconnect.

The packetized interrupt may comprise one or more of information about a type of said interrupt, a destination, and an interrupt level.

The packetized interrupt may comprise information for routing said interrupt over said interconnect.

The interconnect may comprise a network on chip.

The method may comprise routing said interrupts via said interconnect to a destination.

The method may comprise de-packetizing said packetized interrupt at said destination.

According to another aspect, there is provided an apparatus comprising capture circuitry configured to capture a set of interrupts, and output circuitry configured to output serially said interrupts onto an interconnect.

Only active interrupts may be output onto said interconnect.

Processing circuitry may be configured to process said interrupts, said output circuitry outputting said processed interrupts serially onto said interconnect.

Processing circuitry may be configured to determine if all of said captured interrupts which are to be output onto said interconnect have been output by said output circuitry before processing another set of captured interrupts.

The processing circuitry may comprise an interrupt status register and said processing circuitry is configured to update said interrupt status register each time an interrupt has been processed.

The processing circuitry may be configured to process a first set of interrupts while said capture circuitry is capturing a second set of interrupts.

The processing circuitry may be configured to packetize an interrupt before said output circuitry outputs onto said interconnect.

The packetized interrupt may comprise one or more of information about a type of said interrupt, a destination, and an interrupt level The packetized interrupt may comprise information for routing said interrupt over said interconnect.

The interconnect may comprise at least one network on chip.

The apparatus may comprise at least one destination, said interconnect being configured to route said interrupts via said interconnect to said destination.

The apparatus may comprise de-packetizing circuitry configured to depacketize said packetized interrupt at said destination.

A system may comprise a plurality of physical units, each physical unit comprising an interconnect, at least one of said physical units comprising an apparatus such as disclosed above, and at least one physical unit comprising said destination.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. For a better understanding of some embodiments, reference will be made by way of example only to the accompanying drawings in which.

DETAILED DESCRIPTION

Figure 2:
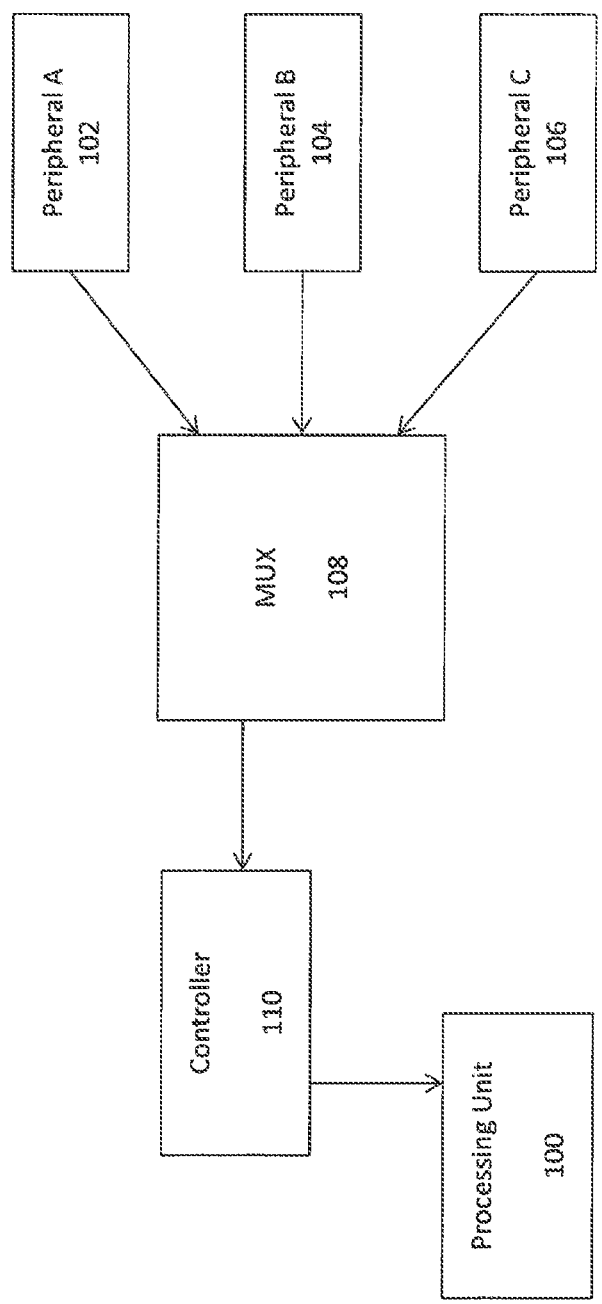
FIG. 2 shows a simplified overview of a system using interrupts.

Reference is first made to FIG. 2 which schematically shows a simplified overview of a system using interrupts. A processing unit 100 is configured to receive requests from for example a first peripheral device 102, a second peripheral device 104, and a third peripheral device 106. The processing unit may comprise a single processor or a plurality of processors.

It should be appreciated that the number of peripheral devices shown is by way of example only and more or less than three peripheral devices may be provided. The requests may be provided additionally or alternatively by circuitry other than the peripheral devices shown. Each peripheral device or other circuitry may be configured to provide one or more separate interrupt requests. By way of example only, the other circuitry may be a memory or register.

Each request is provided separately and is presented to a dedicated input of a routing arrangement 108. This routing arrangement may be provided by a multiplexing arrangement. This routing arrangement will be described in more detail later. This routing arrangement is configured to permit any of the inputs to be mapped to any of the outputs. The outputs may be provided to a request controller 110 which in turn provides the requests to the processing unit 100. The request controller 110 is configured to manage the communication of the requests to the processing unit.

The arrangement of FIG. 2 may be provided on a single integrated circuit or die or may be provided across a plurality of integrated circuits or dies. It should be appreciated that one or more of the parts shown in FIG. 2 may be provided off-chip. For example, one or more of the peripheral devices may be provided off-chip.

Embodiments may be used with any suitable requests. By way of example only, the requests may be interrupt requests, direct memory access (DMA) requests, status requests, and/or service requests.

Figure 1:
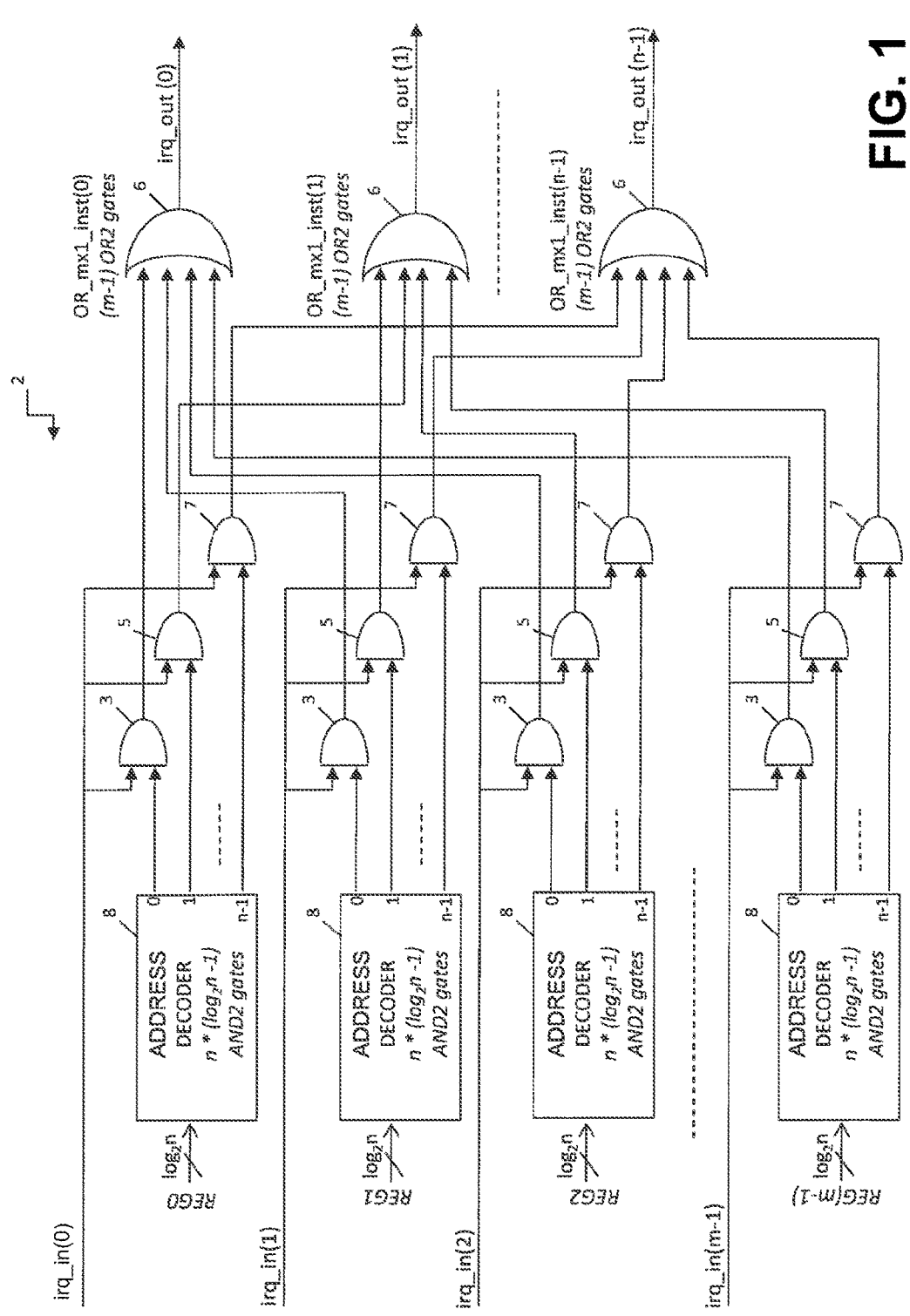
FIG. 1 shows a known request routing arrangement.

Reference is made to FIG. 1 which schematically shows one example of a routing arrangement which is referenced 2. This routing arrangement 2 is configured to receive m inputs (m is the number of interrupts) referenced irq_in[0] to irq_in[m−1]. These inputs are provided by the peripheral devices and/or other circuitry as discussed above. The routing arrangement 2 is configured to provide n outputs (n is the number of level) referenced irq_out[0] to irq_out[n−1].

The routing arrangement is configured to be fully configurable. This means that any input can be routed to any output. This means that the routing arrangement can be configured by software.

Each input signal irq_in is input to a plurality of two input AND gates. In FIG. 1, three AND gates 3, 5 and 7 are shown. In practice n AND gates are provided. The second input to the AND gates associated with a respective one of the input signals is provided by a respective output of a respective address decoder 8. Each address decoder is controlled by the output of a respective register. It should be appreciated that each address decoder provides n outputs, one for each AND gate. There are m address decoders.

Each input signal is thus provided to n AND gates. The first AND gate 3 associated with each input signal has its output provided to an input of a first OR gate. In practice n OR gates are provided. Each OR gate receives m inputs, one associated with each input signal, provided by the output of a respective AND gate. n OR gates are provided. Each one of the OR gates provides one of the respective outputs. The address decoders thus control to which output a given input is routed.

The arrangement of FIG. 1 can be considered to be made up of gates. The function of the arrangement of FIG. 1 can be defined as follows:

For each input pin, an "address decoder tree" is created using the destination output number (set in a programmable register) as the address. The Boolean AND operation is then applied to the input value with each of the decoder outputs (of which there will be one per destination).

For each output pin, the Boolean OR operation is applied to all of the decoded values from each input, together.

OR gates with m inputs can be implemented with m−1 OR2 gates (OR2 is a two input OR gate and AND2 is a two input AND gate)

Total number of gates:
AND2: $m*n*(\log_2 n - 1) + m*n = m*n*\log_2 n$
OR2: $n*(m-1)$
If m=500, n=224
AND2: $500*224*\log_2(224) = 874423$
OR2: $224*499 = 111776$
Total number of gates is ~=1000000 gates=1000 KGates As can be seen the architecture of FIG. 1 is not generally scalable, and with large numbers of inputs and outputs, the architecture may not be routable on an integrated circuit and/or may occupy a significant silicon area.

Some arrangements may need to route a relatively high number of interrupts m to a relatively high number of levels n. In the example discussed above, the number of interrupts is of the order of 500. In some practical implementations, the number of interrupts may exceed 500 and for example may reach 1000. The arrangement shown in FIG. 2 is a simplified arrangement. In practice, there may be a relatively high number of CPUs or interrupt destinations. For example, the number of CPUs may be one or more. In some arrangements, the number of CPUs may be even six or more. As circuits become more complex, the number of CPUs is ever-increasing. Each CPU may have a relatively high number of interrupt levels. For example, some CPUs may have an interrupt level of for example a few hundred. It should be appreciated that the number of CPUs and the number of interrupt levels given is by way of example only and other embodiments may have different numbers of CPUs and different numbers of interrupt levels.

Figure 3:
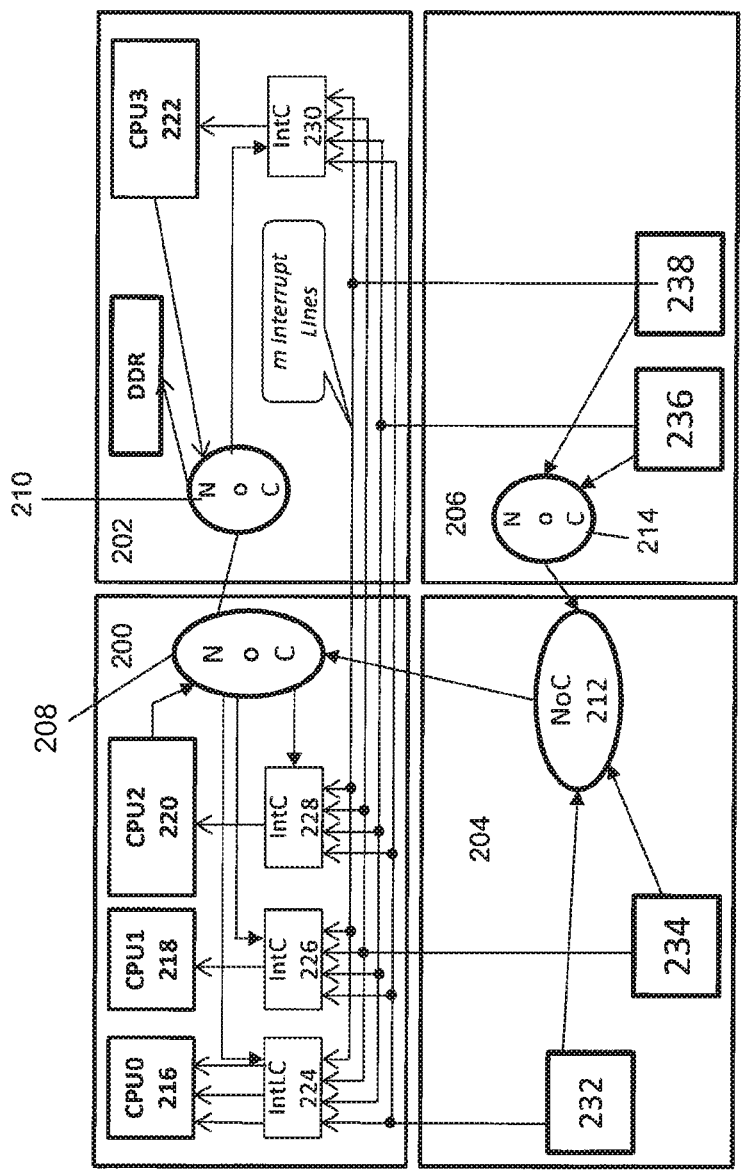
FIG. 3 shows a SoC (system on chip) using the routing arrangement of FIG. 1 with four physical units.

Reference is made to FIG. 3 which shows a SoC with four physical units using the arrangement of FIG. 1. In the arrangement of FIG. 3, four physical units are shown, 200, 202, 204 and 206.

The third physical unit 204 has two peripheral devices or interrupt sources 232 and 234 which can generate interrupts. The third physical unit also has a network on chip 212.

Likewise, the fourth physical unit 206 has two peripheral devices or interrupt sources 236 and 238. The fourth physical unit 206 also has a network on chip 214. The network on chip 212 of the third physical unit 204 is arranged to communicate with the network on chip 214 in the fourth physical unit.

Each of the peripheral devices in a respective physical unit is arranged to communicate with the network-on-chip of the physical unit with which the respective peripheral device is associated.

The first physical unit 200 has three CPU's 216, 218 and 220. An interrupt controller is provided for each of the CPUs. Thus, a first interrupt controller 224 is associated with the first CPU 216, a second interrupt controller 226 is associated with the second CPU 218, and a third interrupt controller 228 is associated with the third CPU 220. The first physical unit 200 also has a network on chip 208.

The second physical unit 202 has a CPU 222 and an associated interrupt controller 230. The second physical unit also has a network on chip 210 which communicates with the network on chip 208 of the first physical unit.

The network on chip 208 in the first physical unit is arranged to be connected to the network on chip 212 in the third physical unit. The network on chip 208 in the first physical unit is also arranged to communicate with each of the interrupt controllers 224, 226 and 228 in the first physical unit and with each of the CPUs 216, 218, 220 in the first physical unit. Likewise, the CPU 222 of the second physical unit is arranged to communicate with network on chip 210 of the second physical unit as is the interrupt controller 230 of that physical unit.

Each of the peripheral devices may be arranged to be able to provide an interrupt to each of the CPUs. Accordingly each peripheral device is connected to each interrupt controller. Thus with the arrangement of FIG. 3, if full interrupt flexibility is required, one interrupt controller needs to be provided for every CPU. As can be seen, each device which is capable of generating an interrupt needs to be wired to each of the interrupt controllers.

If there is a concentration of CPUs in one physical unit, because of the associated interrupt controllers, there may be significant routing within a particular physical unit. In the example of FIG. 3, that would be in the first physical unit. Additionally, the arrangement of FIG. 3 may require significant routing across the physical units.

Some embodiments may reduce the complexity of the arrangement of FIGS. 1 to 3 by using serialization. In particular, interrupts asserted at the same time may be processed sequentially. In practice, in some embodiments, interrupts being asserted at the same time may only happen relatively infrequently. This contrasts with the arrangement of FIG. 1 which allows the concurrent assertion of two or more interrupts. However, as discussed previously, this requires a relatively large area of silicon.

Some embodiments, which are provided with a network on chip, may use that network on chip to route the interrupt packets. In other words, the existing routing network is used for routing an interrupt packet rather than having a dedicated connection.

Figure 4:
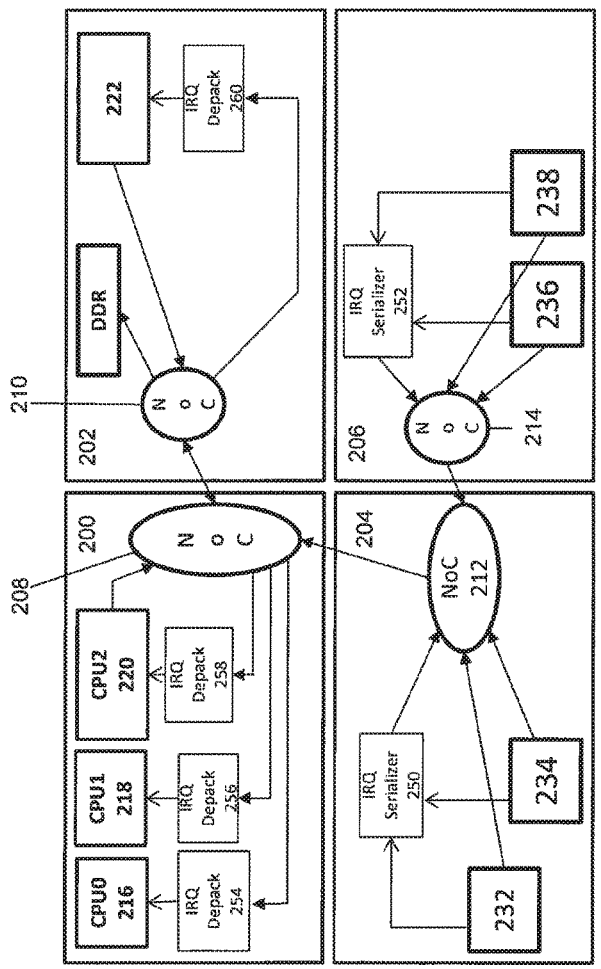
FIG. 4 shows a SoC using the routing arrangement of an embodiment with four physical units.

Reference is made to FIG. 4 which shows an embodiment. The same references are used for parts which are the same as described in relation to FIG. 3. As with the arrangement of FIG. 3, four physical units 200, 202, 204 and 206 are provided. Likewise, each physical unit has a network on chip 208, 210, 212 and 214 as previously described. As with the arrangement of FIG. 3, the first physical unit has three CPUs, 216, 218 and 220. Likewise, the second physical unit has a CPU 222. As with the arrangement shown in FIG. 3, peripheral devices 232 and 234 are provided in the third physical unit and peripheral devices 236 and 238 are provided in the fourth physical unit.

However, in contrast with the arrangement of FIG. 3, no interrupt controllers are provided. As will be described in more detail, in the third physical unit, an interrupt serializer 250 is provided. This serializer is arranged to receive interrupts from each of the peripheral devices 232 and 234. In this embodiment, the serializer 250 receives interrupts from the peripheral devices and/or interrupts in the physical unit in which the serializer 250 is provided. In some embodiments, more than one serializer may be provided on a physical unit. The output of the serializer 250 is coupled to the network on chip 212 of that physical unit.

Likewise, the fourth physical unit has an interrupt serializer 252 which is arranged to receive interrupts from the peripheral devices 236 and 238. Likewise, the serializer 252 is arranged to provide an output to the network on chip 214 of that physical unit. Each of the CPUs is associated with an interrupt unpacker. These are referenced IRQ Depack in FIG. 4. A first interrupt unpacker 254 is associated with the first CPU 216. A second interrupt unpacker 256 is associated with the second CPU, with a third unpacker 256 associated with the third CPU 220. A fourth unpacker 260 is associated with the fourth CPU 222. The unpackers are each provided on the same physical unit as the CPU with which they are associated. The unpackers are arranged to receive inputs from the network on chip of their respective physical unit and to provide an output to the respective CPU.

The interrupt serializer takes interrupts from the peripheral devices or interrupt sources on the same physical unit as the interrupt serializer. The serializer will capture a set of data and in turn packetize each interrupt. While the set of data is serialized by the serializer, new interrupt data defining the next set of data is captured for subsequent processing. Each set of data can be considered to be a vector. When all of the captured interrupts have been put into packets, the next set of captured data can be processed. The serializer will output each interrupt in a packet form. The output will be in serial form. Each packet is put onto the respective network on chip and will include routing information which will allow the interrupt to be routed to the unpacker associated with the CPU for which the interrupt is intended.

The arrangement of FIG. 4 serializes and packetizes the interrupts to allow the implementation of a distributed interrupt controller. This may, in some embodiments reduce the amount of routing required. Some embodiments may allow the interrupt controller function to be distributed across the SoC rather than concentrated in one physical unit. This is in contrast to the arrangement of FIG. 3. Some embodiments may transmit one interrupt assertion or de-assertion at the time. Some embodiments are to detect a greater than one Hamming distance between the registered interrupt vector and the current one. In other words, it is determined if the registered interrupt vector is different from a current interrupt vector.

When there is a difference, some embodiments start processing the least significant bit of the interrupt string which has changed in value. The interrupt can then be mapped into a level (n) by using a relatively small memory, rather than the complex mapping network used in interrupt controller of for example FIG. 1. The interrupt is then sent to its destination (CPU). After the interrupt has been accepted by the destination CPU, the Hamming distance is reduced by one and the next interrupt is processed. The process stops when the Hamming Distance between stored vector and current vector is back to zero.

Figure 5:
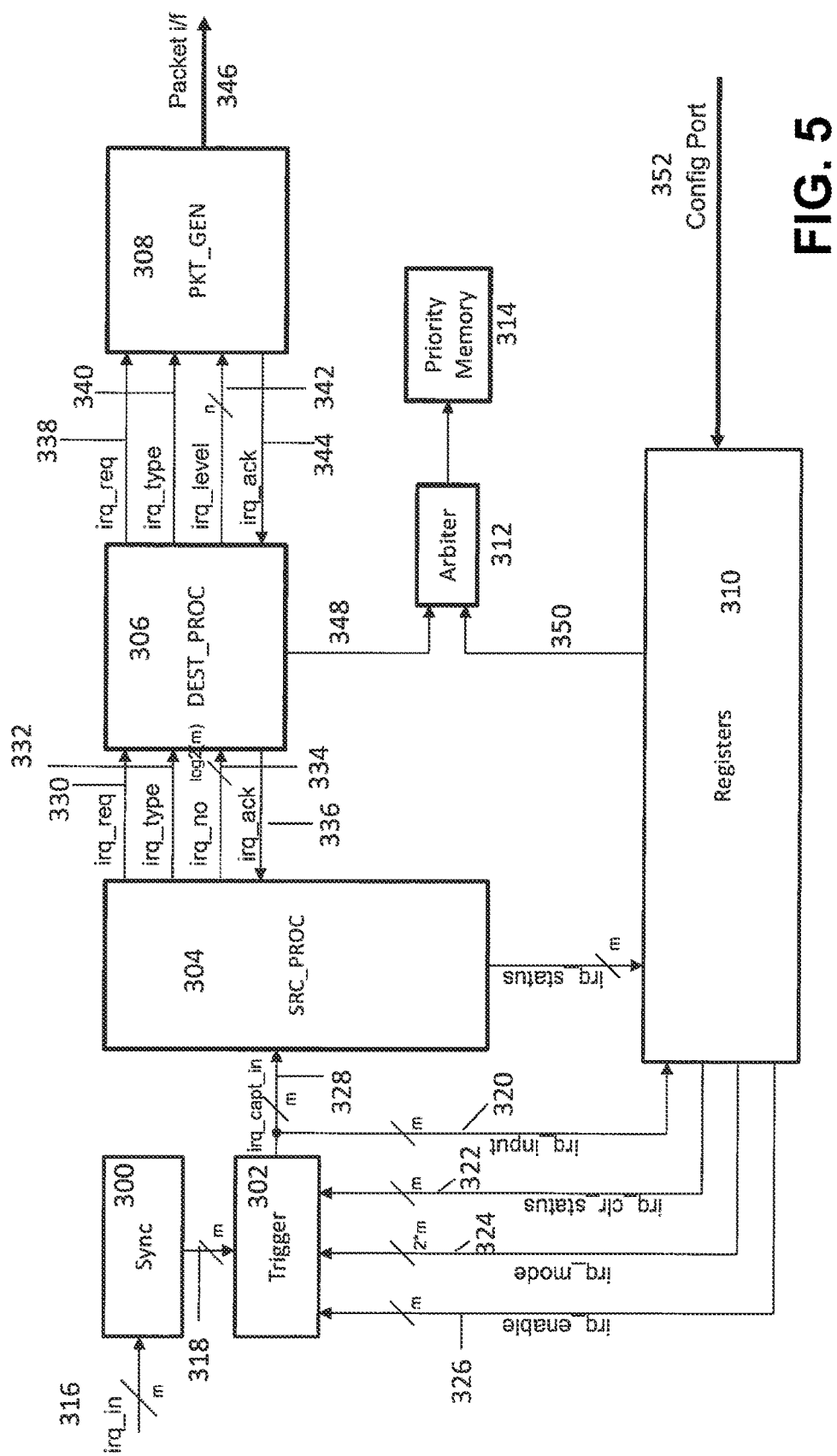
FIG. 5 shows one example of an interrupt request serializer.

Reference will now be made to FIG. 5 which shows one example of a serializer in more detail. A set of interrupts 316 is captured. A set of m interrupt inputs 316 are provided. An input is provided for each interrupt. Each interrupt may be asserted, de-asserted or be inactive. An active interrupt is an interrupt which being one of asserted and de-asserted. If an interrupt needs to be asserted or de-asserted, the interrupt will be present on its associated input. If a particular interrupt is not active, there will be no interrupt asserted or de-asserted on the associated input. The set of interrupt signals are provided to a synchronization block 300 which synchronizes the interrupts. This for example compensates for different timing domains from which the interrupts are received.

The set of synchronized interrupts are provided to a trigger or control block 302. m inputs are provided from the synchronization block 318 to the trigger or control block 302, one associated with each of the m possible interrupts. The control block 302 is configured to receive the following information from a set of registers 310:

an interrupt enable. In the embodiment shown in FIG. 5, m inputs are provided from registers 310. The interrupt enable signal may be for example an enable bit for each interrupt. This will indicate if the interrupt is one which is capable of being active. If an interrupt is capable of being active, then the corresponding interrupt may be active or inactive;

interrupt mode information. The registers 310 also provide interrupt mode information 324. In this arrangement, 2*m interrupt mode inputs are provided. This will indicate the mode of the interrupt. In some embodiments, two bits are used to provide this information. For example, the mode information may indicate if the interrupt is a high level interrupt, a low level interrupt, a rising edge interrupt or a falling edge interrupt; and interrupt clear status. This indicates for each interrupt if the interrupt has been cleared. In this context, cleared means that interrupt has been packetized. The registers 310 provide for each interrupt a clear status signal.

The trigger block 302 provides the captured set 328 of interrupts to both the registers 310 and a source processing block 304.

Figure 6:
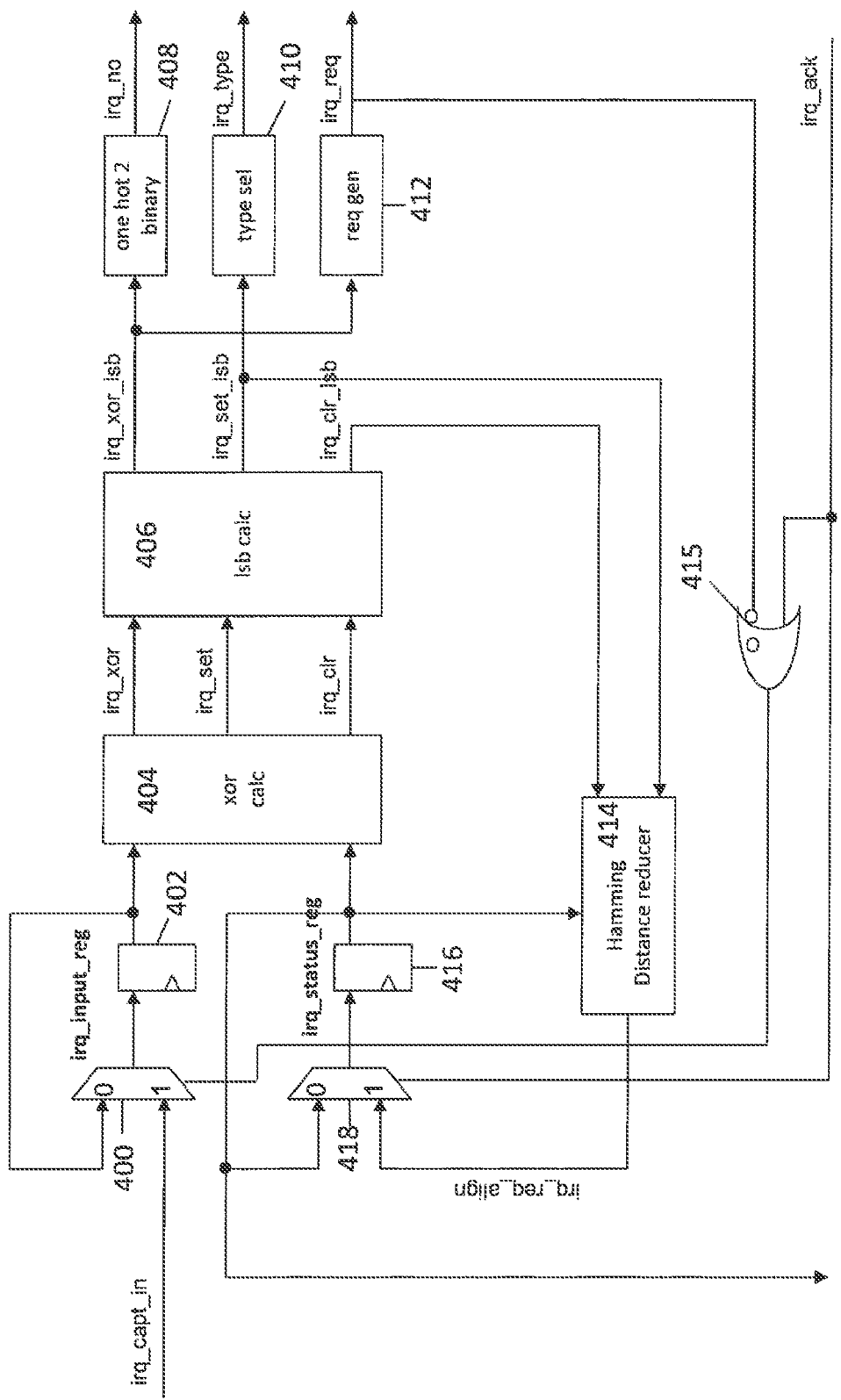
FIG. 6 shows one example of the source processor of the interrupt request serializer of FIG. 5.

Reference is made to FIG. 6 which shows the circuitry of the source processing block 304 in more detail. The set 328 of input interrupts are input via a set of multiplexers 400 to a set of interrupt input registers 402. There are m multiplexers 400 and m input registers 402. The set of interrupts are loaded into the registers 402. Once the set of interrupts has been loaded into the input registers, the output of the registers 402 is fed back into the input of the registers 402 via the multiplexers 402 to reinforce the values of the set of interrupts held in the registers.

A set of m interrupt status registers 416 are provided. A register is provided for each interrupt. Each time an interrupt has been packetized this will change the corresponding status register to the value which indicates that the interrupt has been packetized. This may be the value "1" in some embodiments. The output of each of the status registers is fed back into the input of the respective status register via a multiplexer 418. The multiplexer 418 also provides an interrupt request alignment input which is used to change the value of the status register associated with the interrupt which has been packetized. In other words, this will indicate for each interrupt if it is active whether or not it has been packetized.

The set of captured interrupts and the outputs of the status registers are provided to an exclusive OR (XOR) block 404. This block 404 is configured to provide an interrupt exclusive OR output irq_xor which is obtained by carrying out an XOR function on the interrupt input registers and the status register. This will identify which interrupts are active and which have not yet been packetized. This block is configured also to provide an interrupt set output irq_set obtained by carrying out an AND function on the input registers and NOT the status registers. This will provide the associated interrupt type information for the interrupts which have not been packetized. Finally, an interrupt clear output irq_clr is provided which is obtained by carrying out an AND function on NOT the interrupt input register and the interrupt status register.

The three outputs provided by the XOR function block 404 are provided to a least significant bit block 406. The least significant bit block 406 is configured to determine the least significant bit of the XOR output of the XOR calculation irq_xor_lsb. The least significant bit block is also arranged to provide an output interrupt set least significant bit signal irq_set_lsb which is obtained by carrying out an AND function on the interrupt set output irq_set and the least significant bit of the XOR output irq_xor_lsb signal. Finally, the least significant bit block 406 is arranged to provide a interrupt clear least significant bit signal irq_clr_lsb which is obtained by carrying out an AND function on the clear signal irq_clr and the least significant bit of the XOR output irq_xor_lsb signal.

The XOR output irq_xor_lsb signal is input to a one hot to binary block 408. This effectively uses the position of the asserted least significant bit value of the XOR output irq_xor_lsb signal to provide a binary number for the interrupt which is to be packetized. The output irq_no is the number of the interrupt provided in binary form. The function of the blocks 404 and 406 is to allow one interrupt to be packetized at a time starting with the interrupt having the lowest number. For example if interrupts 3, 5 and 7 are all asserted, interrupt 3 is packetized first, followed by interrupt 5 and then interrupt 7.

The interrupt set least significant bit signal irq_set_lsb is provided to a type selector block 410. The output irq_type indicates if an interrupt is being asserted or if it is being cleared and uses the interrupt set least significant bit signal irq_set_lsb. The output irq_type type takes the '0' value when all bits of the vector irq_set_lsb are at '0' otherwise that signal is set to "1". This signal will indicate if the interrupt packet being sent is used to assert an interrupt level or to clear it.

The XOR output irq_xor_lsb signal is also provided to a request generator 412 which generates the interrupt request irq_req. The signal irq_req will take the '0' value when all bits of the signal irq_xor_lsb are at '0', otherwise that signal is set to '1'. This is used to indicate that a request is to be generated.

The interrupt set least significant bit signal irq_set_lsb and the interrupt clear output irq_clr are provided to a Hamming distance reducing function block 414. Effectively, this block compares the two signals. If they are the same, it can be determined that all of the interrupts in the set of interrupts have been packetized. If the values are different, it can be determined that there are still interrupts to be packetized. If the values are the same, then it can be determined that the set of interrupts have all been packetized and the next set of interrupts should be processed.

It should be appreciated that the interrupt set least significant bit signal irq_set_lsb is used to update the corresponding bit in the status register. The Hamming distance reducer block is configured to provide an output irq_req_align which is determined as (interrupt set least significant bit signal irq_set_lsb or the status register) AND not the interrupt clear output irq_clr. In particular, this output is provided to the status register. This is combined with the status register in order to update the status register with the latest level being sent. The status register takes the values from the Hamming Distance reducer only when the packet is sent (irq_ack=1) otherwise the status register takes the previous registered value.

The OR gate 415 is configured to receive the irq_req signal and the irq_ack signal. This controls the multiplexers to close the registers to new values (so the registered irq_input_reg interrupt vector is used) when the irq_req is high and the ack is not yet received (irq_ack=0) and open the registers to a new interrupt vector (irq_capt_in) when the ack is received or the irq_req is low.

The output of the status registers is also provided to the registers 310 of FIG. 5.

Referring back to FIG. 5, the interrupt request irq_req, interrupt type irq_type, and interrupt number output irq_no are provided to a destination processing block 306. This block is responsible for accessing internal memory 314 to retrieve the interrupt level to which the input interrupt is mapped. In some embodiments, "m" interrupts that are mapped into "n" levels. M may be greater than or equal to n. The usage of this level approach allows a number of interrupts that is greater than the one each individual CPU is able to manage to be managed. A local memory 314 is used to manage the mapping of each interrupt to the level (sometimes referred to as the priority). The same memory may also be used to define the CPU destination of each interrupt. The CPU destination field may be used to route the packet over the NoC to the appropriate interrupt unpacker. This memory has to be accessed by both the destination processing module 306 (when preparing the information needed by the packet generator) but also by the CPU. An arbiter 312 is provided to control access to the memory. By accessing this memory, the CPU is able to get the priority information. By combining the priority information with the status register, the software is able to understand what was the interrupt that triggered the level.

Thus the output of the destination processing block 306 provides an indication that a request is to be packetized, the type of the interrupt, and the interrupt level. The interrupt packet request can thus comprise: the CPU destination or the CPU number, the interrupt type, and the interrupt level.

The outputs of the destination processing block 306 are provided to the packet generator 308 which puts this information into a packet. For example, bits 0 to 7 may be used for the interrupt level or number, bit 8 can be used for the type of interrupt, and 3 bits may be used for the CPU destination. It should be appreciated that the number of bits in each of these fields is by way of example only.

Thus, if an interrupt is active, that is asserted or de-asserted, then that interrupt is packetized. If the interrupt is inactive, this is not packetized.

In some embodiments, the CPU destination field can be used to route the packet to the correct unpacker. It should be appreciated that when a packet has been generated, an acknowledgement is provided to the destination processing block 306. The destination processing block 306 provides that acknowledgement to the source processing block 304. This acknowledgement can be used to indicate that the next interrupts should be processed.

The interrupt unpacker de-packetizes the interrupt information and applies the correct interrupt to the receiving CPU.

There may be one interrupt unpacker per CPU (or per module receiving interrupts). The interrupt level field of the packet is extracted and translated from binary into 'one hot' format. This puts the interrupt onto the connection associated with that interrupt number. The interrupt type field of the packet is extracted and used to update the final interrupt vector to the CPU.

If the interrupt type indicates that the interrupt is an assert, the one hot version of the IRQ LEVEL is ORed with the current vector (interrupt level is asserted).

If the interrupt type indicates that the interrupt is a de-assert, the one hot version of the IRQ_LEVEL is inverted and then ANDed with the current vector (interrupt is cleaned).

In some embodiments two or more interrupts may be mapped to the same level. Each o_irq bit (going to the CPU) may have an associated counter, to count how many interrupts are outstanding, mapped onto that level. The counters may not need to be very large. For example the maximum size may depend on how many interrupts need to be mapped to the same level. A size of m/n may be sufficient to support the worst case scenario where all interrupts are active at the same time.

Some embodiments have been described in relation to an SoC using physical units. It should be appreciated that alternative embodiments may be used with other arrangements which do not use the physical unit concept.

It should be appreciated that in the example embodiments, the different blocks of the figures may be implemented by circuitry. The blocks may be implemented solely by hardware or by a mix of hardware and software.

The embodiments have described one example of an interrupt serializer. However it should be appreciated that this is only one way in which the serializer may be realized. Different embodiments may use different circuitry and/or logic in order to capture a set of interrupts and serially output packets onto the systems interconnect. The output packets will each have the interrupt as well as routing information to ensure that the packet is routed to the unpacker associated with the CPU for which the interrupt is intended.

Some embodiments have been described which serialize the interrupts starting with the lowest numbered interrupt. In other embodiments, the serialization may start with the highest numbered interrupt. In other embodiments, the serialization may be done in any suitable order.

In some embodiments two or more parallel serializers may be provided that put packets onto the interconnect.

In some embodiments, a dedicated interconnect may be provided for transporting the packets between the serializers and the interrupt unpackers.

The described embodiments have described the packetizing of interrupts. It should be appreciated that in other embodiments, a method other than packetizing may be used.

Embodiments may be provided on one or more integrated circuits or dies for inclusion in a system-in-package.

Embodiments can be used in any suitable device. By way of example only, the devices may include set top boxes, mobile phones, smart phones, personal data organizers, or any other suitable device. Some embodiments may find application where there are large, complicated systems on chip requirements.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
capturing a set of interrupts;
processing interrupts of said set of interrupts, wherein said processing includes determining at least one Hamming Distance between two interrupts of the set of interrupts;
outputting serially said processed interrupts of said set of interrupts onto a shared interconnect for routing to at least one destination of a plurality of destinations; and
based on the at least one Hamming Distance, determining if all of said interrupts of said captured set of interrupts which are to be output onto said shared interconnect have been output onto said shared interconnect before processing another set of captured interrupts.

2. The method as claimed in claim 1, wherein said outputting includes:
outputting only active interrupts, wherein active interrupts are interrupts that have been actively asserted or de-asserted by a peripheral device onto said shared interconnect.

3. The method as claimed in claim 1, comprising:
updating an interrupt status register each time an interrupt is processed.

4. The method as claimed in claim 1, comprising:
concurrent with said processing, capturing a second set of interrupts.

5. The method as claimed in claim 1, wherein processing said interrupts comprises:
packetizing each interrupt before outputting said interrupt serially onto said shared interconnect.

6. The method as claimed in claim 5, wherein said packetizing each interrupt comprises:
providing information about one or more of: a type of said interrupt, a destination of said interrupt, and an interrupt level of said interrupt.

7. The method as claimed in claim 5, wherein said packetizing each interrupt comprises:
providing information associated with routing said interrupt over said shared interconnect.

8. The method as claimed in claim 1, wherein said outputting serially interrupts of said set of interrupts onto the shared interconnect includes outputting serially interrupts of said set of interrupts onto a network on chip.

9. The method as claimed in claim 1, comprising:
routing said interrupts of said set of interrupts via said shared interconnect to a destination.

10. The method as claimed in claim 5, comprising:
de-packetizing each of said packetized interrupts at said destination.

11. An apparatus, comprising:
capture circuitry configured to capture a set of interrupts;
processing circuitry configured to process interrupts of said set of interrupts, wherein said processin includes determining at least one Hamming Distance between two interrupts of the set of interrupts; and
output circuitry configured to output serially said processed interrupts of said set of interrupts onto a shared interconnect for routing to at least one destination of a plurality of destinations,
wherein based on the at least one Hamming Distance, said processing circuitry is configured to determine if all of said interrupts of said captured set of interrupts which are to be output onto said shared interconnect have been output by said output circuitry before processing interrupts of another set of captured interrupts.

12. The apparatus as claimed in claim 11, comprising:
a circuit configured to detect active interrupts; and
a circuit configured to permit outputting only active interrupts onto said shared interconnect.

13. The apparatus as claimed in claim 11, wherein said processing circuitry comprises:
an interrupt status register, said processing circuitry configured to update said interrupt status register each time an interrupt is processed.

14. The apparatus as claimed in claim 11, wherein said processing circuitry is configured to process interrupts of a first set of interrupts concurrent with capture circuitry capturing interrupts of a second set of interrupts.

15. The apparatus as claimed in claim 11, wherein said processing circuitry is configured to packetize each interrupt before said output circuitry outputs said interrupt serially onto said shared interconnect.

16. The apparatus as claimed in claim 15, wherein said processing circuitry configured to packetize each interrupt is further configured to provide information about one or more of: a type of said interrupt, a destination of said interrupt, and an interrupt level of said interrupt.

17. The apparatus as claimed in claim 15, wherein said processing circuitry configured to packetize each interrupt is further configured to provide information associated with routing said interrupt over said shared interconnect.

18. A system having a plurality of physical units, comprising:
a first physical unit having a destination; and
a second physical unit having:
capture circuitry configured to capture a set of interrupts;
processing circuitry configured to process interrupts of said set of interrupts, wherein said processing circuitry is arranged to determine at least one Hamming Distance between two interrupts of the set of interrupts; and
output circuitry configured to output serially said processed interrupts of said set of interrupts onto a shared interconnect for routing to at least one destination of a plurality of destinations, at least one interrupt directed to said destination of the first physical unit,
wherein based on the at least one Hamming Distance, said processing circuitry is configured to determine if all of said interrupts of said captured set of interrupts which are to be output onto said shared interconnect have been output by said output circuitry before processing interrupts of another set of captured interrupts.

19. The system as claimed in claim 18, wherein said shared interconnect includes at least one network on chip.

20. The system as claimed in claim 18, said second physical unit comprising:
processing circuitry configured to packetize each interrupt before said output circuitry outputs said interrupt serially onto said shared interconnect.

21. The system as claimed in claim 18, wherein said processing circuitry of said second physical unit is configured to distinguish between active interrupts and inactive interrupts.

* * * * *

UNITED STATES PATENT AND TRADEMARK OFFICE
CERTIFICATE OF CORRECTION

PATENT NO. : 10,255,207 B2
APPLICATION NO. : 14/536014
DATED : April 9, 2019
INVENTOR(S) : Davide Sarta et al.

Page 1 of 1

It is certified that error appears in the above-identified patent and that said Letters Patent is hereby corrected as shown below:

In the Claims

Column 11, Line 23:
"said set of interrupts, wherein said processin includes"
Should read:
--said set of interrupts, wherein said processing includes--.

Signed and Sealed this
Twenty-fifth Day of June, 2019

Andrei Iancu
*Director of the United States Patent and Trademark Office*